(12) United States Patent
Hayashi

(10) Patent No.: US 7,543,143 B2
(45) Date of Patent: Jun. 2, 2009

(54) SERVICE DATA MULTICASTING SYSTEM AND METHOD THEREFOR AND SECURITY KEY GENERATING SYSTEM

(75) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 755 days.

(21) Appl. No.: 10/424,924

(22) Filed: Apr. 29, 2003

(65) Prior Publication Data
US 2003/0208538 A1 Nov. 6, 2003

(30) Foreign Application Priority Data
May 1, 2002 (JP) ............................ 2002-129449

(51) Int. Cl.
*H04L 9/00* (2006.01)
(52) U.S. Cl. .................. 713/163; 713/150; 713/162
(58) Field of Classification Search .................. None
See application file for complete search history.

(56) References Cited

U.S. PATENT DOCUMENTS

| | | | |
|---|---|---|---|
| 5,987,137 A | 11/1999 | Karppanen et al. | |
| 6,477,644 B1 * | 11/2002 | Turunen | 713/161 |
| 7,028,186 B1 * | 4/2006 | Stenman et al. | 713/173 |
| 7,307,963 B2 * | 12/2007 | Chow et al. | 370/259 |
| 2004/0101138 A1 * | 5/2004 | Revital et al. | 380/210 |

FOREIGN PATENT DOCUMENTS

| | | |
|---|---|---|
| CN | 1224284 A | 7/1999 |
| EP | 1 283 618 A2 | 2/2003 |
| JP | 4-239237 A | 8/1992 |
| JP | 11-143953 A | 5/1999 |
| JP | 2001-77859 A | 3/2001 |
| JP | 2001-256195 A | 9/2001 |
| JP | 2001-282748 A | 10/2001 |
| JP | 2003-533112 A | 11/2003 |

OTHER PUBLICATIONS

Li Gong et al., "Multicast Security and its Extension to a Mobile Environment", Wireless Networks, ACM, U.S., vol. 1, No. 3, Oct. 1, 1995, pp. 281-295.
Shin-ya Tanaka et al., "A Key Distribution and Rekeying Framework with Totally Ordered Multicast Protocols" 2001, pp. 831-838.
Matthew J. Moyer et al., "Survey of Security issues in Multicast Communications" IEEE Network, IEEE Inc. New York, U.S., vol. 13, No. 6, Nov. 1999, pp. 12-23.

* cited by examiner

*Primary Examiner*—Pramila Parthasarathy
(74) *Attorney, Agent, or Firm*—Sughrue Mion, PLLC

(57) ABSTRACT

In a mobile communication system, upon multicasting a service data through a common channel in a radio communication area, a user not subscribing is disabled a multicasted service data, and charge can be applied only for the subscribing user. As a generating method of a security key for applying security for the multicoated service data, in SGSN, the security key is generated corresponding to the multicasting service for security process. The multicasted service data applied security process can be transmitted through the common channel in the radio communication area between RAN and UE (terminal), and the service data cannot be decoded by the user who is not subscribing.

4 Claims, 9 Drawing Sheets

SERVICE DATA MULTICASTING SYSTEM AND METHOD THEREFOR AND SECURITY KEY GENERATING SYSTEM

BACKGROUND OF THE INVENTION

1. Field of the Invention

The present invention relates generally to a service data multicasting system, a method therefor and a security key generating system. More particularly, the invention relates to a service data multicasting system delivering service data, such as video image and so forth to general public mobile stations in a mobile communication system.

2. Description of the Related Art

As a multicast service content in such service data multicasting system, image, such as video image and so forth may be delivered, for example. Such system is premised in that a user in receipt of multicasted service data, is enabled to receive the multicasted data only after subscribing such service.

In the multicast service in the mobile communication system, the multicast service data is multicasted through a common radio channel in a certain radio communication area. The reason is to simplify a process in a control station of a radio base station by transferring data through certain single common radio channel which all users may receive, rather than transferring the same service data to a plurality of users through respective dedicated channels, since it becomes unnecessary to set radio channels corresponding to individual users.

Since a service provider charges per service for the users, only users subscribing the multicasting service can receive the service data. In other words, the service provider is liable to enable all of the subscribing users to receive the service data. However, as feature of the multicasting system, the multicasted service data is transferred through one common channel to be received by all users so that the user not subscribing may receive such service data. Therefore, certain restriction control is required for the users receiving the service data.

As the most effective means for restricting reception for the users, it is possible to enable decoding of the transferred service data only for the subscribing users. In order to realize this, security may be applied for the service data to disable decoding for the not subscribing users.

However, a current security control method in the mobile communication system is a system for generating security key (cipher key) for security per the mobile station. Therefore, the current security control system is not applicable for the foregoing multicasting system. The reason is that since the multicasting system has to enable all of subscribing users to receive the service data as set forth above, if security key corresponding to particular terminal is applied, other terminal may not release security lock even though it receives the service data.

SUMMARY OF THE INVENTION

The present invention has been worked out in view of the shortcoming set forth above in the prior art. Therefore, it is an object of the present invention to provide a service data multicasting system, a method therefor and a security key generating system which disables decoding of the multicasted service data by not subscribing user and enables charging to only subscribing users upon multicasting service data through a common channel in a radio communication area in a mobile communication system.

According to the first aspect of the present invention, a service data multicasting system multicasting service data with applying security by a security key (cipher key) in a mobile communication system, comprises:

generating means for generating the security keys corresponding to respective of a plurality of multicasting services.

The generating means may have a correspondence table, in which correspondence between respective multicasting services and security keys is recorded, and may generate security keys with reference to the correspondence table on the basis of the multicasting services demanded by users.

The generating means may assign non-used security key for the multicasting service when the demanded multicasting service by the user is demanded at the first time. The generating means may have storage means for storing correspondence information between the multicasting service and the assigned security key, when multicasting of the same multicasting service is subsequently demanded, the security key may be read out from the correspondence information in the storage means. The generating means may generate the security key corresponding to an address indicative of a provider of the multicasting service.

The service data multicasting system may further comprise:

security processing means for multicasting the multicasting service data to a demanding user with providing security process by the security key generated by the generating means; and transmitting means for transmitting the security key to the demanding user.

According to the second aspect of the present invention, a method of multicasting service data applying security by a security key in a mobile communication system, comprises:

generating step of generating the security keys corresponding to respective of a plurality of multicasting services.

A correspondence table, in which correspondence between respective multicasting services and security keys may be provided, and security keys may be generated in the generating step with reference to the correspondence table on the basis of the multicasting services demanded by users.

A non-used security key may be assigned for the multicasting service in the generating step when the demanded multicasting service by the user is demanded at the first time. Providing storage means for storing correspondence information between the multicasting service and the assigned security key, the security key may be read out from the correspondence information in the storage means in the generating step when multicasting of the same multicasting service is subsequently demanded. The security key may be generated in the generating step corresponding to an address indicative of a provider of the multicasting service.

The method of multicasting service data may further comprise:

security processing step of multicasting the multicasting service data to a demanding user with providing security process by the security key generated by the generating step; and transmitting step of transmitting the security key to the demanding user.

According to the third aspect of the present invention, a security key generating system in a service data multicasting system multicasting service data with applying security by a security key in a mobile communication system, comprises:

generating means for generating the security keys corresponding to respective of a plurality of multicasting services.

According to the fourth aspect of the present invention, a storage medium recording a program of multicasting service data applying security by a security key in a mobile communication system, the program comprises:

generating step of generating the security keys corresponding to respective of a plurality of multicasting services.

In the operation of the present invention, as a generating method of a security key for applying security for the multicasting service data, security process is performed generating the security keys respectively corresponding to the multicasting services. Therefore, the multicasting service data provided security process can be multicasted through the common channel in the radio communication area, and the user who is not subscribing the service cannot decode the service data.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a service data multicasting system, a multicasting method and a security key generating system according to the present invention with reference to the accompanying drawings. In the following description, numerous specific details are set forth in order to provide a thorough understanding of the present invention. It will be obvious; however, to those skilled in the art that the present invention may be practiced without these specific details.

Figure 1:
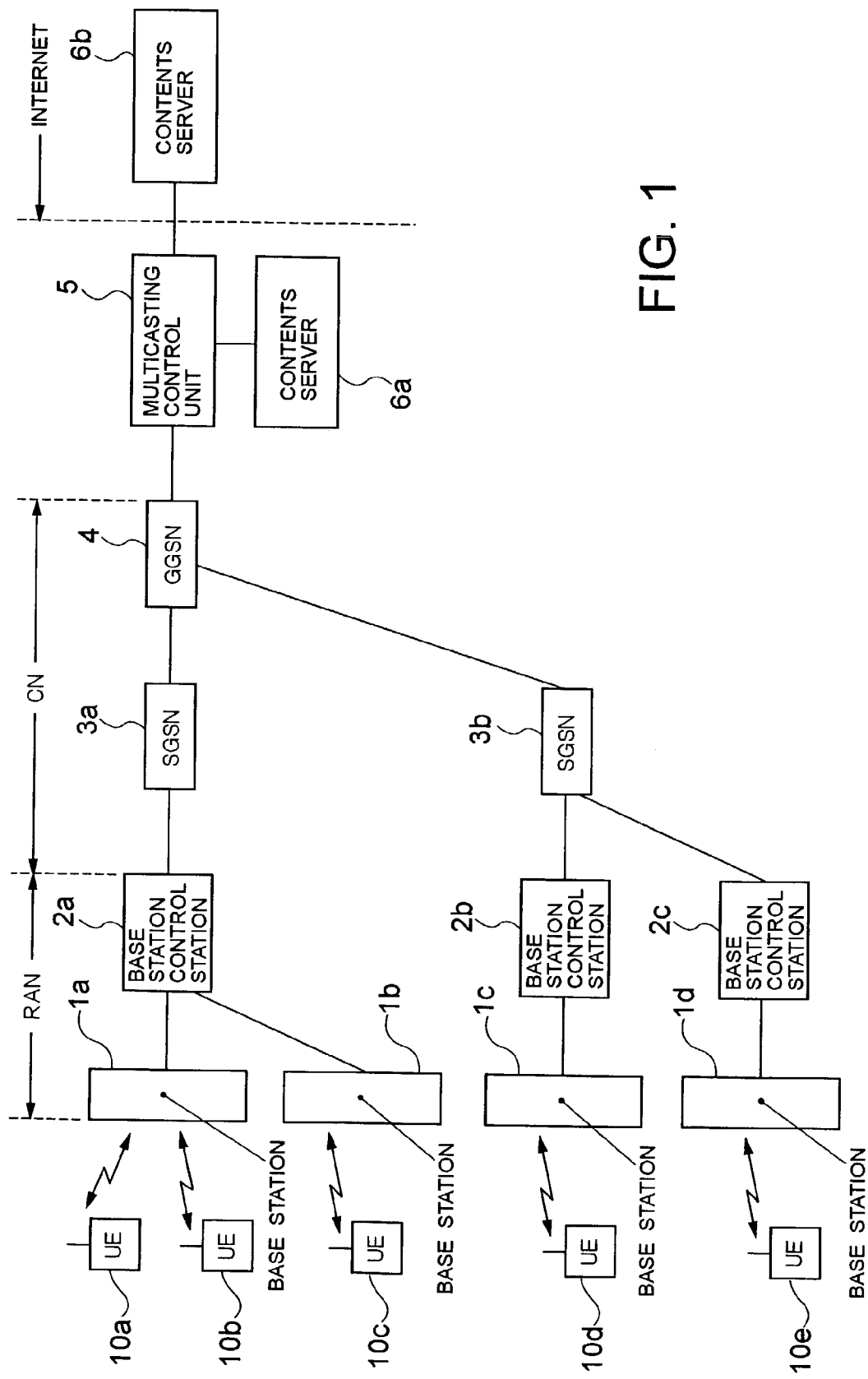
FIG. 1 is a functional block diagram of a mobile communication system applied an embodiment of the present invention for multicasting service.

FIG. 1 is a functional block diagram of a service data multicasting system in a mobile communication system, to which the preferred embodiment of the present invention is applied. Referring to FIG. 1, in respective service areas (cells) of respective radio base stations (hereinafter simply referred to as base station) 1a to 1d, mobile stations (UE) 10a to 10e are present respectively.

The base stations 1a and 1b are respectively connected to a radio base station control station 2a (hereinafter simply referred to as base station control station), and the base stations 1c and 1d are respectively connected to base station control stations 2b and 2c. The base station control station 2a is connected to SGSN (Serving GPRS (General Packet Radio Service) Support Node) 3a, and the base station control stations 2b and 2c are connected to SGSN 3b, respectively. SGSNs 3a and 3b are connected to GGSN (Gateway GPRS Support Node) 4. SGSNs and GGSN have functions realizing packet switching function, and are defined by 3GPP (3rd Generation Partnership Projects).

GGSN 4 is connected to contents servers 6a and 6b for multicasting service via a multicast control unit 5. It should be noted that, in the shown embodiment, the contents server 6b is illustrated as being presented in the Internet. SGSNs 3a and 3b and GGSN 4 form a core network (CN) of the mobile communication system. On the other hand, the base stations 1a to 1d and base station control stations 2a to 2c form radio access network (RAN).

As a premise of the present invention, in a portable terminal as mobile station (UE) of user receiving multicasting service, it becomes necessary that the user knows what multi casting services are present. For this purpose, it becomes necessary to generate and broadcast a menu list. Therefore, in the multicast control unit 5, an up-to-date menu list of multicasting services is generated. Namely, the multicast control unit 5 regularly receives information of up-to-date multicasting services (index of the contents to be provided by the service or the like) from contents servers 6a and 6b to generate the menu list as shown in FIG. 2.

Figure 2:
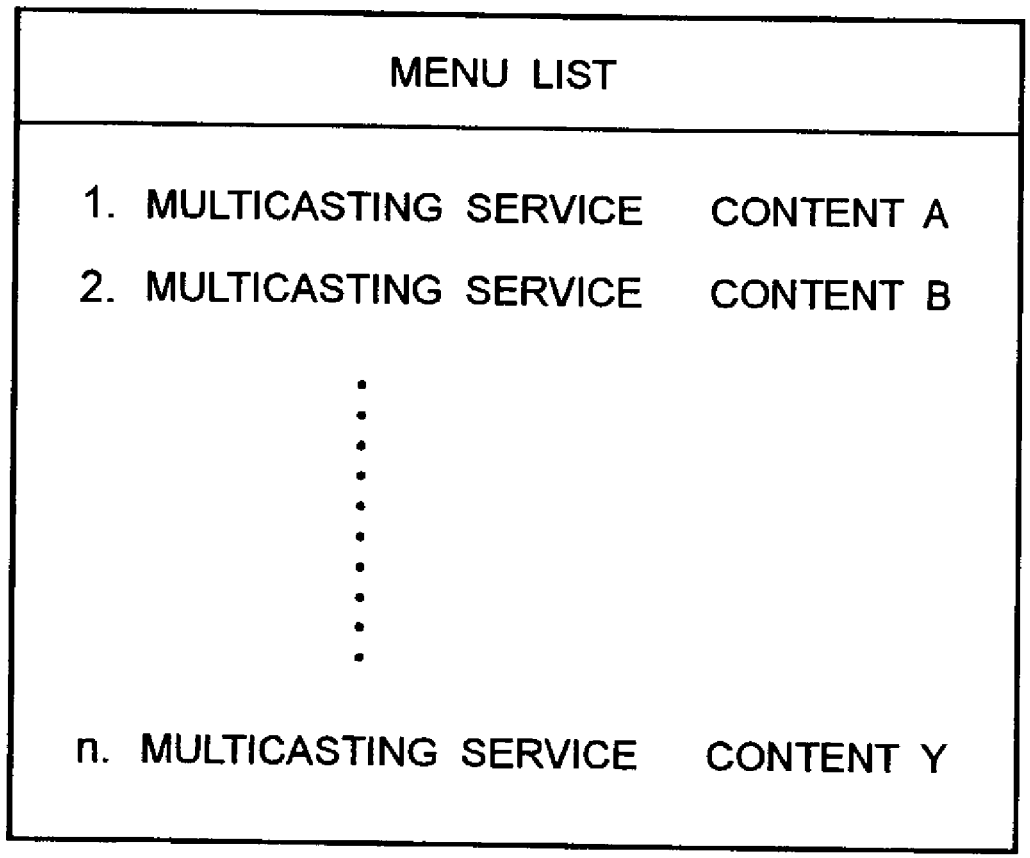
FIG. 2 is an illustration showing an example of a menu list in a user terminal (mobile station) for the multicasting service.

In FIG. 2, a first multicasting service (1) has contents indexed as "A", and a second multicasting service (2) has contents indexed as "B". This menu list is generated in the multicast control unit 5 and is broadcasted to portable terminals of general public users via GGSN 4, SGSNs 3a and 3b, the base station control stations 2a to 2c and the base stations 1a to 1d. Broadcasting is performed by generating paging message by SGSNs 3a and 3b.

Figure 3:
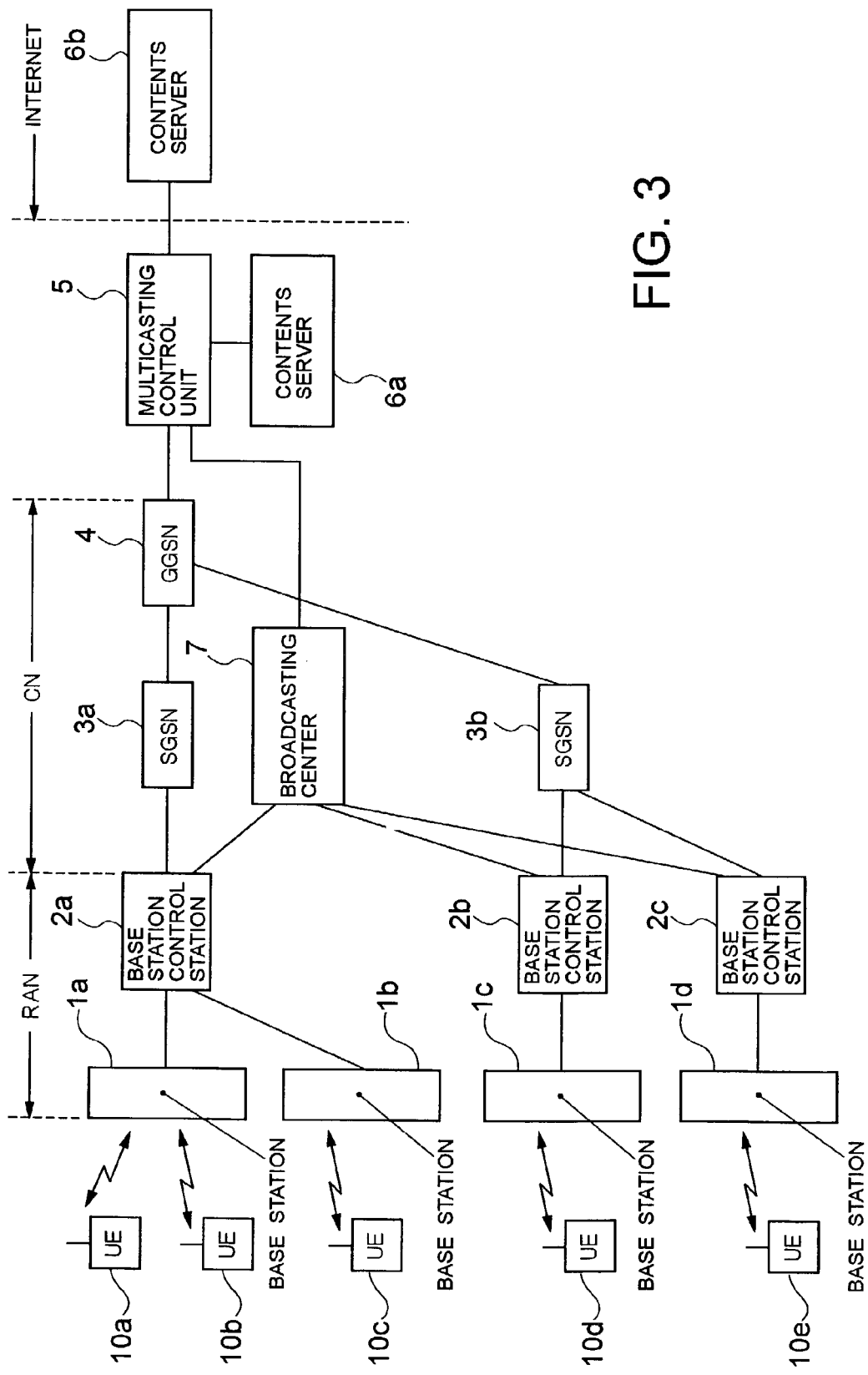
FIG. 3 is a functional block diagram of another mobile communication system applied an embodiment of the present invention for the multicasting service.

In the alternative of broadcasting of the menu list by the paging message, it is possible to separately provide a broadcasting center 7 in the core network (CN) to send the menu list from the multicast control unit 5 to the broadcasting center 7 for broadcasting of the menu list from the broadcasting center 7. It should be noted that in FIG. 3, like components to the same or similar to those in FIG. 1 will be identified by like reference numerals. The system shown in FIG. 3 is differentiated from the system shown in FIG. 1 only in that the broadcasting center 7 is provided.

Figure 4:
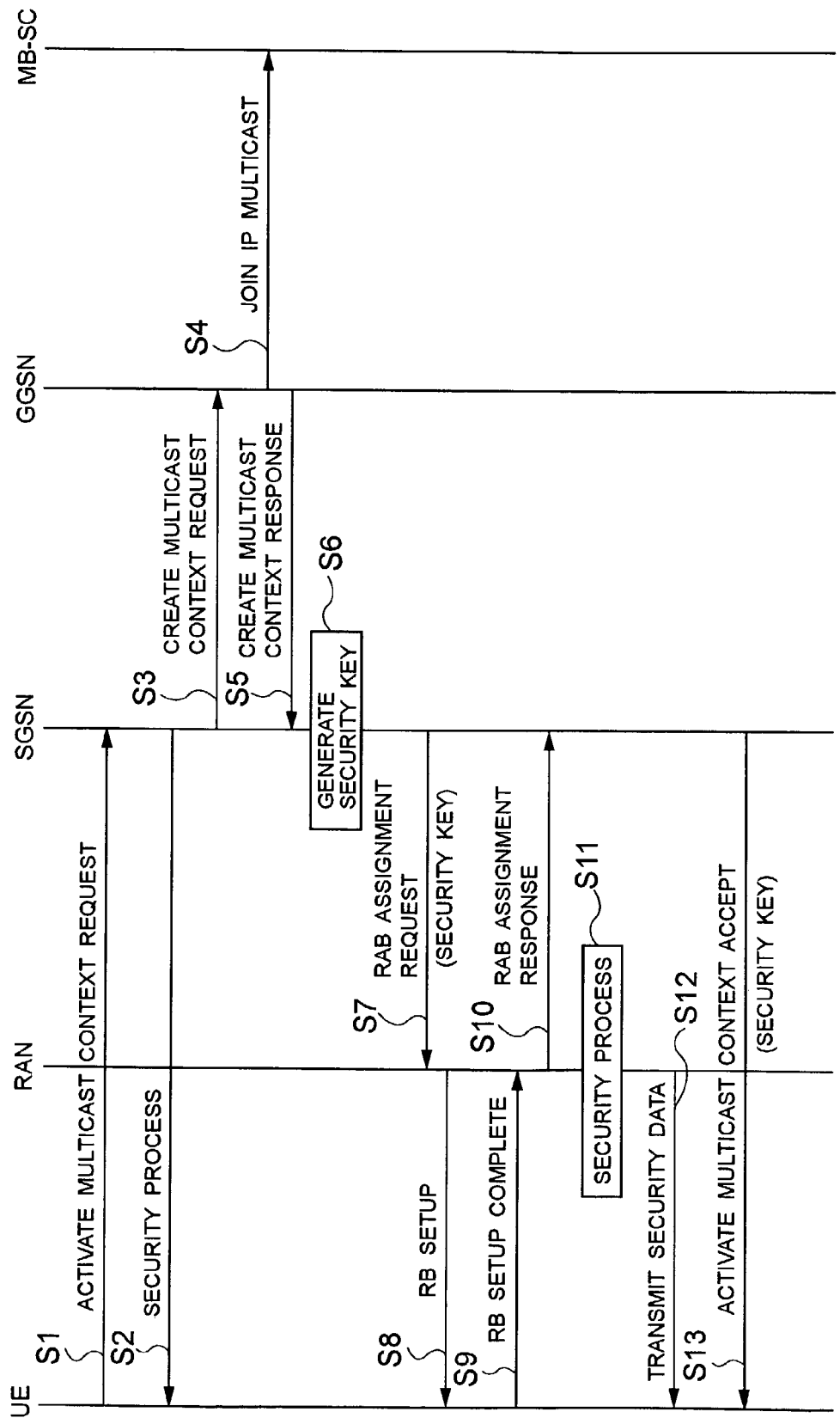
FIG. 4 is sequence chart showing operation of the embodiment of the present invention.

With reference to the broadcasted menu list shown in FIG. 2, the user may select desired multicasting services. FIG. 4 is an operation sequence chart of the shown embodiment taking operation for selecting the multicasting service as trigger. Referring to FIG. 4, in response to selecting operation of the multicasting service by the user, the portable terminal (UE) transmits a "Activate Multicast Context Request" via RAN to SGSN (step S1). SGSN performs authentication of the user to activate and execute a security processes (step S2).

If the "Activate Multicast Context Request" from the user is the first one for SGSN, SGSN transmits "Create Multicast Context Request" for demanding setting of GTP (GPRS Tunneling Protocol) tunnel to GGSN (step S3).

In GGSN, if the tunnel setting demand from SGSN is for the multicasting service first time for GGSN, GGSN transmits "Join IP Multicast" as "Join signal" for subscribing contents server via the multicast control unit (MB-SC: Multicast Broadcast Center) (step S4).

Figure 5:
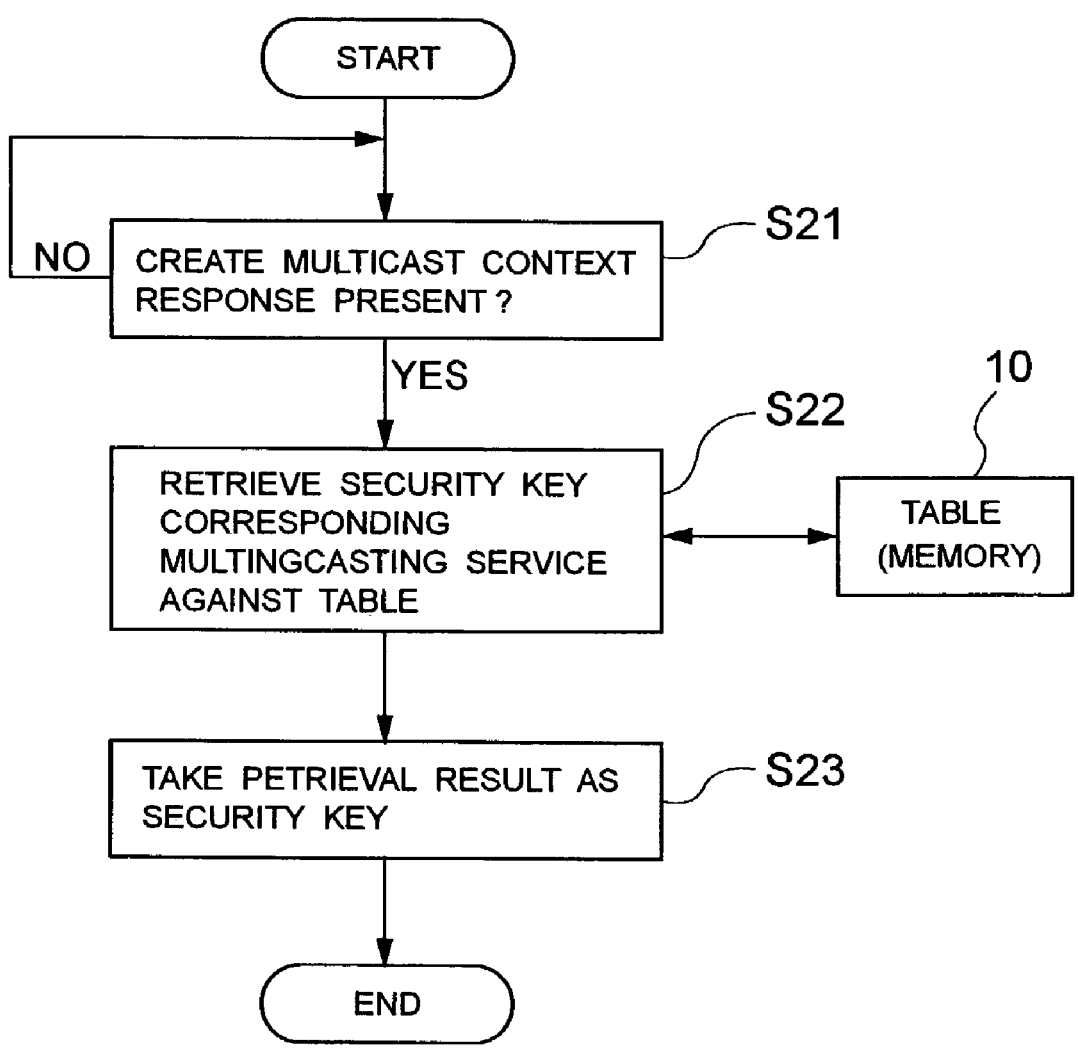
FIG. 5 is an illustration showing an example of operation flow for generating a security key in the embodiment of the present invention.

Here, if subscription of the multicasting service is proper, GGSN transmits "Create Multicast Context Response" to SGSN (step S5). In receipt of the "Create Multicast Context Response", SGSN generates a security key (step S6). Operation of security key generation process will be discussed with reference to the flow of FIG. 5

Figure 6A:
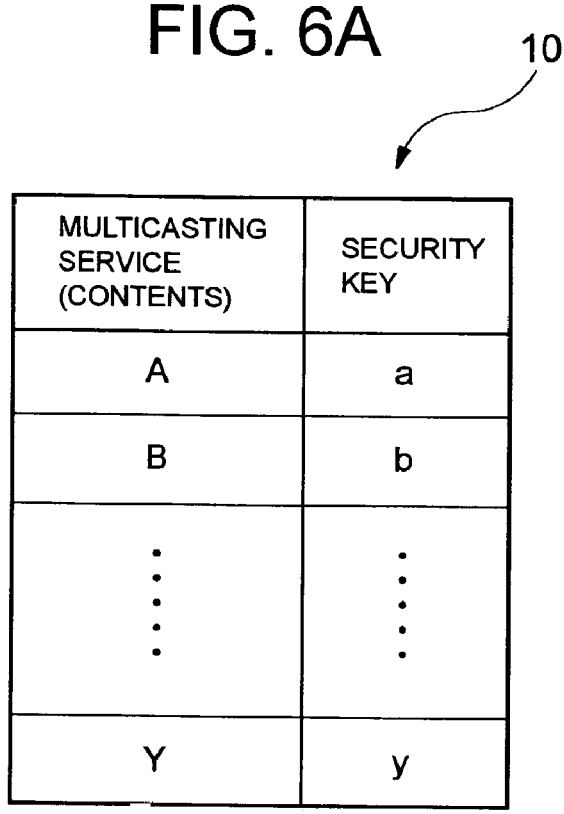
FIGS. 6A and 6B are illustrations showing examples of a table of FIG. 5.

When the "Create Multicast Context Response" from GGSN is received (step S21), a security key corresponding to the multicasting service selected by the user is retrieved by a table 10 in SGSN (step S22). The table 10 is a memory. As shown in FIG. 6A, a correspondence table between the multicasting service and the security key are preliminarily stored.

Since information identifying the multicasting service selected by the user is contained in the "Activate Multicast Context Request", SGSN may recognize the multicast service selected by the user from this information.

Figure 6B:
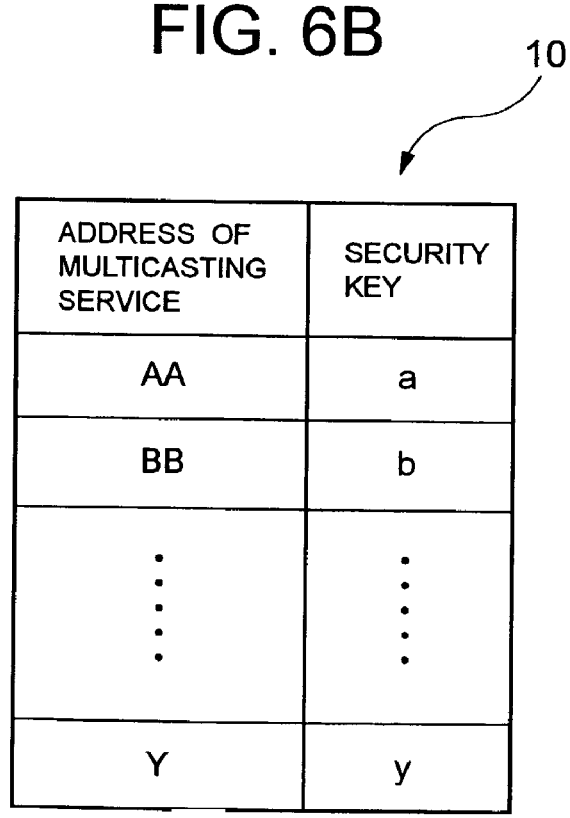

On the other hand, the information for identifying the multicasting information selected by the user contains address of a provider of the service. If the address and the multicasting service correspond in one-to-one basis, a table, in which the addresses of the multicasting services and the security keys are preliminarily corresponded as shown in FIG. 6B, may be used as the table 10.

In this case, as the address, IP (Internet Protocol) address is generally used. One thus obtained serves as the security key for security of the multicasting service data.

Figure 7:
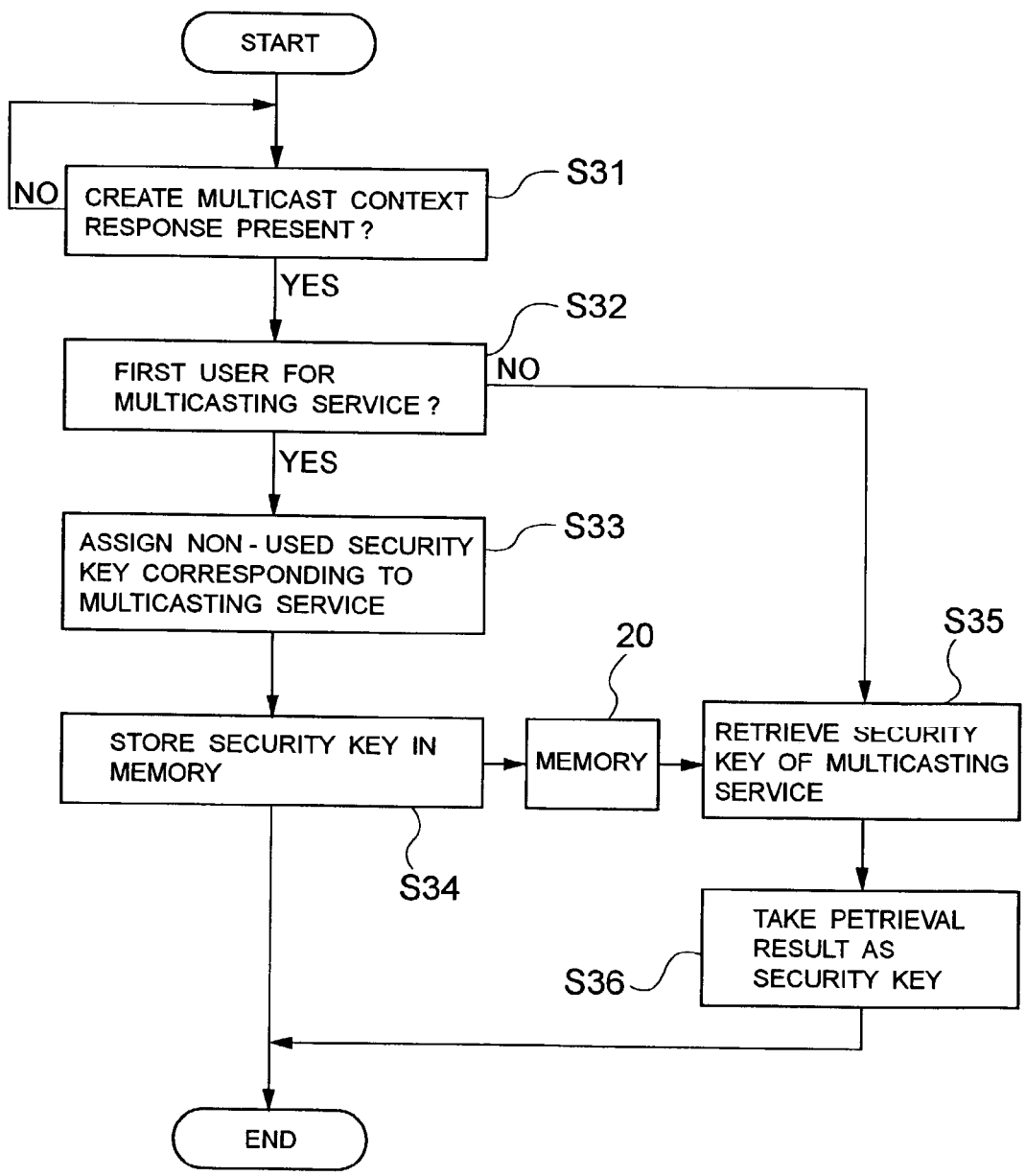
FIG. 7 is an illustration showing another example of operation flow for generating a security key in the embodiment of the present invention.
Figure 8:
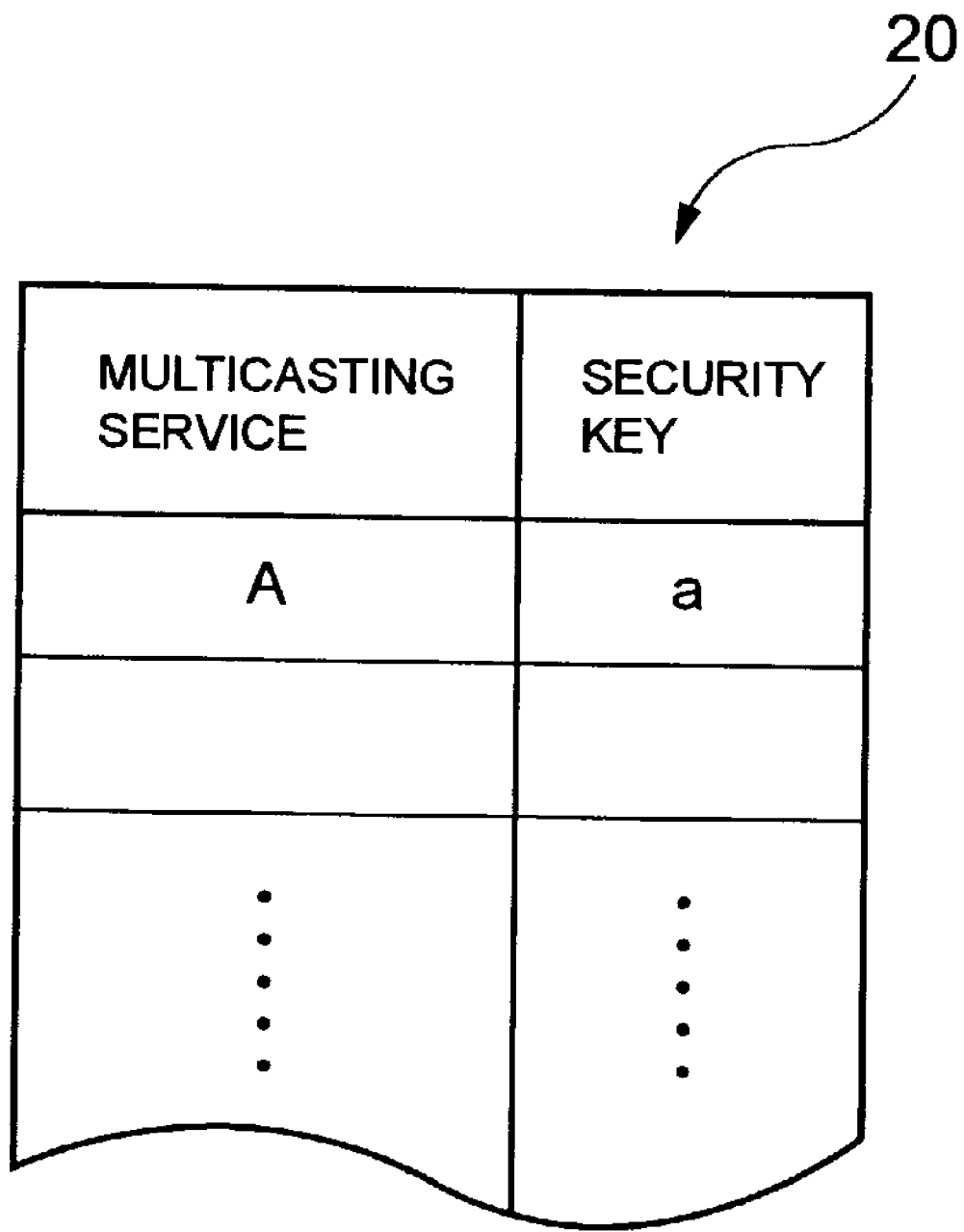
FIG. 8 is an illustration showing an example of stored information of a memory of FIG. 7.

FIG. 7 is a flowchart showing another example of security key generation process S6 in SGSN. Referring to FIG. 7, upon receipt of "Create Multicast Context Response" from GGSN (step S31), judgment is made in SGSN whether the user is the first user for the multicasting service (step S32). If so, one non-used security key corresponding to the multicasting service is assigned (step S33). The security key is stored in the memory 20 corresponding to the multicasting service (step S34). An example of information to be stored in the memory 20 may be a correspondence table between the multicasting service and the security key as shown in FIG. 8. FIG. 8 shows that a security key "a" is assigned for the multicasting service "A".

If "NO" at step S32, since the security key for the multicasting service is already assigned at steps S33 and S34, the correspondence information is stored in the memory 20. Accordingly, by retrieving correspondence information of the memory 20, the security key for the multicasting service is read out (step S35). The result of reading out (retrieval result) is taken as security key (step S36).

Referring to FIG. 4 again, in order to demand setting of radio access bearer (RAB) for transferring multicasting service data for RAN, SGSN transmits "RAB Assignment Request". At this time, generated security key is set in "Request" (step S7).

If the multicast service data has already been transferred through the common channel in the radio communication area in the past, SGSN does not set the security key for the multicast service in the "RAB Assignment Request". Since the security key for the multicast service is not set in the "RAB Assignment Request", RAN continuously transmit the multicast service data for which security is established in the common channel of the radio communication area.

Subsequently, RAN sets up radio bearer (RB) with the mobile station as the user terminal (UE). This is illustrated as "RB Setup" (step S8). Then, from the mobile station, "RB Setup Complete" indicating that radio bearer is set up, is transmitted to RAN (step S9). In response to this, in order to notify that setting up of radio access bearer is completed, to SGSN, RAN transmits "RAB Assignment Response" to SGSN (step S10). Then, RAN applies security for the multicasting service data (data to be downloaded via the bearer which is already set up in respective procedure between MB-SC, GGSN, SGSN and RAN) (step S11).

The multicasting service data thus applied security process is transmitted from RAN using the common channel of the radio communication area as radio bearer set through the foregoing procedure (step S12). At the same time, in response to "Activate Multicast Context Request" at step S1, SGSN sets up and transmits the security key in "Activate Multicast Context Accept" via RAN (step S13). The transmission in this case performs by using a dedicated channel set individually for the user. In the user terminal, upon receipt of the "Activate Multicast Context Accept", judgment is made that subscribing the multicasting service is normal and successful, and the security key set therein is taken out. The multicasting service data already multicasted through the common channel of the radio communication area is received to be decoded.

Figure 9:
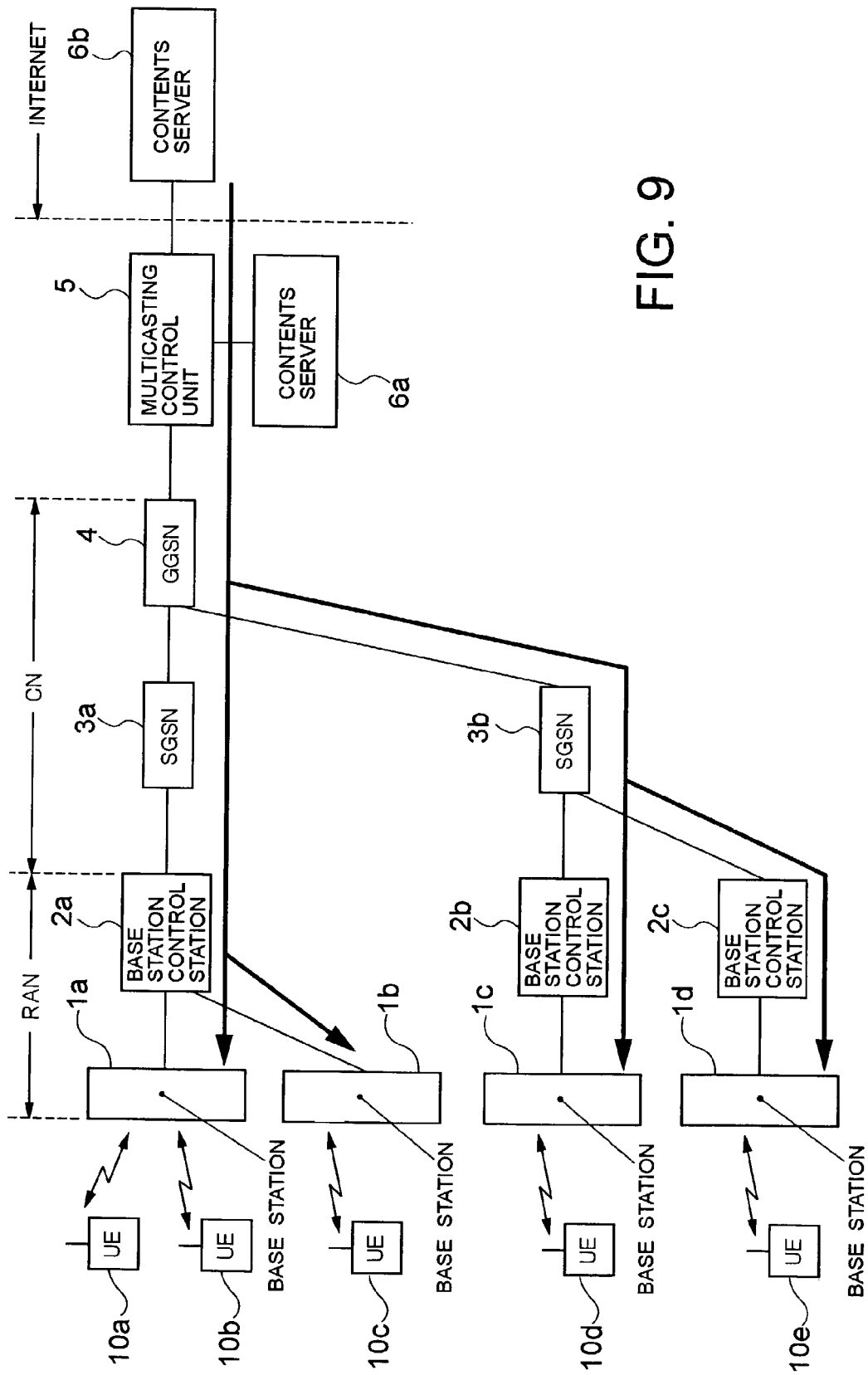
FIG. 9 is an illustration for explaining an example of multicasting of service data in the mobile communication system applied the embodiment of the present invention.

When the user setting can be completed according to the foregoing sequence, multicasting of the multicasting service data as shown by thick line 100 of FIG. 9 is performed. It should be noted that, in FIG. 9, there is shown a condition where other user-is already receiving multicasting service data before setting of certain one user.

As set forth above, with the present invention, since security setting process of the multicasting service data is provided by setting the security key per the multicasting service, the multicasting service data can be multicasted through the common channel in the radio communication area, and can disables the user not subscribing the service to decode the data. Therefore, only users subscribing the service may decode data, and charge can be applied only for such subscribing users.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A service data multicasting system for multicasting service data with security provided by a security key in a mobile communication system, the system comprising:

a generating means for generating security keys, each of the security keys corresponding to a respective one of a plurality of multicasting services that were broadcast to a plurality of users over a common channel such that each of the plurality of users may receive multicasting service data, wherein, when a multicasting service is demanded for a first time, said generating means assigns a non-used security key to the multicasting service, and wherein said generating means has storage means for storing correspondence information between the multicasting service and the assigned security key, and when multicasting of a same multicasting service is subsequently demanded, the security key is read out from the correspondence information in said storage means.

2. A method of multicasting service data with security provided by a security key in a mobile communication system, the method comprising:

generating security keys, each security key corresponding to a respective one of a plurality of multicasting services that were broadcast to a plurality of users over a common channel such that each of the plurality of users may receive multicasting service data, wherein, when a multicasting service is demanded for a first time, assigning a non-used security key to the multicasting service, the method further comprising:

storing correspondence information between the multicasting service and the assigned security key; and when multicasting of a same multicasting service is subsequently demanded, reading out the security key based on the correspondence information.

3. A security key generating system in a service data multicasting system multicasting service data with security provided by a security key in a mobile communication system, the system comprising:

a generating means for generating security keys, each security key corresponding to a respective one of a plurality of multicasting services that were broadcast to a plurality of users over a common channel such that each of the plurality of users may receive multicasting service data, wherein, when a multicasting service is demanded for a first time, said generating means assigns a non-used security key to the multicasting service, and wherein said generating means has storage means for storing correspondence information between the multicasting service and the assigned security key, and when multicasting of a same multicasting service is subsequently demanded, the security key is read out based on the correspondence information in said storage means.

4. A storage medium recording a program for multicasting service data with security provided by a security key in a mobile communication system, said program comprising:

generating security keys, each security key corresponding to a respective one of a plurality of multicasting services that were broadcast to a plurality of users over a common channel such that each of the plurality of users may receive multicasting service data, wherein, when a multicasting service is demanded for a first time, assigning a non-used security key to the multicasting service, said program further comprising:

storing correspondence information between the multicasting service and the assigned security key, and when multicasting of a same multicasting service is subsequently demanded, reading out a security key based on the correspondence information.

* * * * *